Patented Feb. 5, 1929.

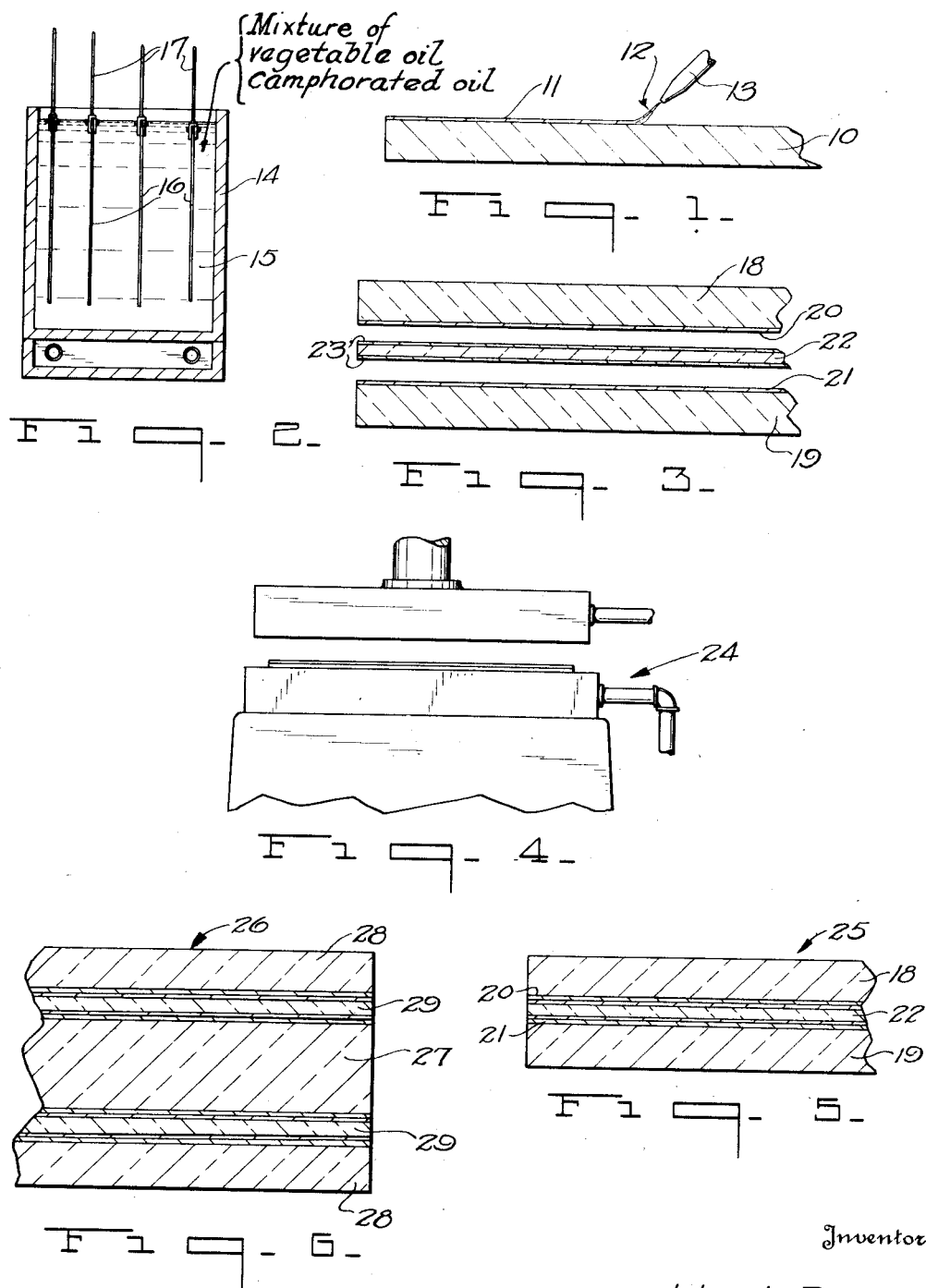

1,701,147

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS AND PROCESS OF PRODUCING THE SAME.

Application filed October 8, 1926. Serial No. 140,286.

The present invention relates to laminated glass.

An important object of the invention is to provide as a new article of manufacture a sheet of laminated glass and to the process of producing the same wherein a plurality of laminations are united by the aid of a substance permitted to act on one of the laminations to make the same tacky or sticky, after which the laminations are superimposed and pressed together.

Another object of the invention is to provide as a new article of manufacture a sheet of laminated glass and a process of producing the same wherein a sheet of non-brittle material is subjected to the action of an oil bath, the oil containing a substance capable of making the non-brittle sheet tacky or sticky, after which said sheet is interposed between two sheets of glass and united thereto, preferably under the action of heat and pressure.

Still another object of the invention is to provide an article and process of producing the same as above set forth, wherein a sheet of glass is coated to form a skin thereon, the skin being united to a sheet of non-brittle material by the aid of camphorated oil interposed therebetween.

A further object of the invention is to provide, as a new form of bonding material in the manufacture of laminated glass, an oil or similar liquid containing a substance having a slight solvent action on one of the laminations.

Other objects and advantages of the invention will become more apparent during the course of the following description.

In the drawings wherein like numerals are employed to designate like parts throughout the same, Fig. 1 is a fragmentary sectional view illustrating diagrammatically one step in the production of laminated glass in accordance with the present invention, Fig. 2 is another view showing a further step, Fig. 3 shows in section the laminations in superimposed relationship before they are united, Fig. 4 is a diagrammatic representation of a form of press which may be used to unite the laminations, Fig. 5 is a sectional view of one form of finished product, and Fig. 6 is a similar view of another form of product.

In the production of laminated glass in accordance with the present invention, a sheet of glass 10 which may be ground and polished as desired is preferably provided with a coating 11 of some suitable material which is permitted to dry, thus forming a skin closely adhering to said sheet of glass. The skin 11 may be formed by spraying a solution 12, by the means 13, upon the sheet of glass.

In Fig. 2 is shown a tank or some suitable receptacle 14 containing a liquid 15. The liquid 15 is preferably a camphorated oil formed by dissolving gum camphor in a vegetable oil such as castor oil or linseed oil. The numeral 16 designates a sheet of non-brittle material which is preferably a transparent cellulose composition material. The sheets are suspended by the means 17 in the bath of oil 15. In Fig. 3 is shown two sheets of glass 18 and 19 respectively having the skins 20 and 21 formed thereon as set forth in Fig. 1. A sheet of non-brittle material 22 having the films 23, is interposed between the skins 20 and 21. The laminations are placed in the press designated in its entirety by the numeral 24, where, under the action of heat and pressure, an efficient and permanent bond is obtained between the laminations. The numeral 25 designates the finished product formed in the press 24 from the laminations set forth in Fig. 3.

The skin 11 formed on the sheet of glass 10 may be seasoned or dried to the desired extent, and I prefer that a slight amount of solvent be left therein, although of course all of the solvent or practically all of the solvent can be evaporated therefrom.

It has been found that an efficient bond can be obtained between a sheet of glass thus coated and a sheet of non-brittle material by interposing a suitable film therebetween and then pressing the laminations together to expel practically all of the film. To remove excess liquid from between the laminations the pressure applied in the press 24 is preferably initially exerted centrally of the laminations.

The bath 15 forming the films 23 may be any suitable oil containing a suitable solvent, although I prefer camphor in a vegetable oil. The camphor acts as a solvent for the cellulose sheet 22, and the amount of solvent action with the resultant tackiness or stickiness of the sheet, after its treatment in the bath 15, can be controlled by the percentage of camphor or other solvent in the said bath.

The numeral 26 designates another form of laminated glass which is known in the art as bullet-proof glass. Bullet-proof glass is characterized by its central heavy plate of glass 27, two outer sheets of glass 28, and the two inner sheets of non-brittle material 29. These laminations are joined in accordance with the process above set forth.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. As a new article of manufacture, a sheet of laminated glass, including a sheet of non-brittle material having a film of camphorated oil thereon.

2. As a new article of manufacture, a sheet of laminated glass including a quantity of camphorated oil.

3. As a new article of manufacture, a sheet of laminated glass including, as a bonding medium, camphorated oil.

4. As a new article of manufacture, a sheet of laminated glass including a sheet of glass, a skin on said sheet, and a film of camphorated oil.

5. As a new article of manufacture, a sheet of laminated glass comprising a sheet of glass, a skin thereon, a sheet of non-brittle material, and a film of camphorated oil between the skin and the non-brittle sheet.

6. As a new article of manufacture, a sheet of laminated glass including a sheet of non-brittle material and a film of oil containing a relatively small percentage of a solvent for the non-brittle material.

7. As a new article of manufacture, a sheet of laminated glass including a sheet of non-brittle material having a film of vegetable oil plus a solvent for the non-brittle material thereon.

8. As a new article of manufacture, a sheet of laminated glass including a sheet of non-brittle material having a film of vegetable oil plus camphor thereon.

9. As a new article of manufacture, a sheet of laminated glass including a sheet of glass, and a sheet of non-brittle material, and a film of camphorated oil therebetween, the camphorated oil comprising camphor dissolved in a vegetable oil.

10. The process of producing laminated glass consisting in treating a sheet of cellulose composition material in an oil bath containing a solvent, and then uniting the same to a sheet of glass.

Signed at Toledo, in the county of Lucas and State of Ohio, this 5th day of October, 1926.

JOHN L. DRAKE.